United States Patent [19]

Jacobson

[11] 4,325,740

[45] Apr. 20, 1982

[54] POLYMERIC AMINE METALLATE COATINGS

[75] Inventor: Howard W. Jacobson, Wilmington, Del.

[73] Assignee: E. I. Du Pont de Nemours and Company, Wilmington, Del.

[21] Appl. No.: 218,681

[22] Filed: Dec. 29, 1980

Related U.S. Application Data

[63] Continuation-in-part of Ser. No. 27,026, Apr. 4, 1979, abandoned, which is a continuation-in-part of Ser. No. 188,989, Sep. 22, 1980, abandoned.

[30] Foreign Application Priority Data

Apr. 1, 1980 [MX] Mexico ................................ 181806

[51] Int. Cl.³ .............................................. C04B 31/02
[52] U.S. Cl. .................................. 106/300; 427/220; 106/308 N

[58] Field of Search ........................... 106/300, 308 N; 427/220

[56] References Cited

U.S. PATENT DOCUMENTS 2,780,558  2/1957  Wilcox ................................ 106/300
2,985,685  5/1961  Thomas et al. ...................... 260/485

FOREIGN PATENT DOCUMENTS 2202921  5/1974  France .

*Primary Examiner*—Sam Silverberg

[57] ABSTRACT

A particulate or fibrous substrate having a coating of a polymeric amine aluminate or zincate prepared by contacting said substrate with said aluminate or zincate or a precursor thereof and exposing the substrate and aluminate, zincate or precursor to a temperature of 50°–350° C.

14 Claims, No Drawings

POLYMERIC AMINE METALLATE COATINGS

CROSS REFERENCE TO RELATED APPLICATION

This is a continuation-in-part of copending application Ser. No. 027,026, filed Apr. 4, 1979, abandoned which in turn is a continuation-in-part of copending application Ser. No. 188,989, filed Sept. 22, 1980, abandoned.

DESCRIPTION

1. Technical Field

The process of this invention relates to a substrate coated with a polymeric amine metallate and a process for preparing said coated substrate. More specifically, the process of this invention relates to the preparation of a substrate with a coating of polymeric amine zincate or aluminate having 0.17-2% zinc or aluminum as the oxide.

2. Background Art

Triethanolamine aluminate (TEAAL) is disclosed in U.S. Pat. No. 2,985,685. A process for preparing TEAAL and the use of it as a catalyst, among other things, is also disclosed. British Pat. No. 1,123,559 discloses TEAAL and its use in aqueous emulsion paint formulations to gel the paint.

In the field of pigments, the coating of $TiO_2$ with aluminum oxide to prevent discoloration and reduce chalking is known. The use of aluminum isopropoxide and a fluid energy mill for coating $TiO_2$ with alumina is disclosed in U.S. Pat. No. 2,780,558.

DISCLOSURE OF THE INVENTION

A new coating has been found for various substrates that consists essentially of a polymeric amine metallate of the general formulae (a)

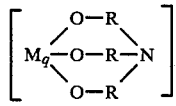

where R is an alkylene radical of 2-6 carbon atoms, n is an integer of 4-6, q is 1 when M is aluminum, q is 3/2 when M is zinc and M is aluminum or zinc, or (b)

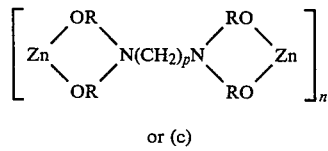

or (c)

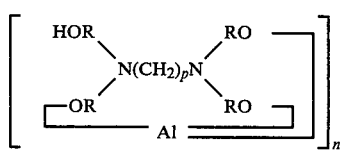

where p is an integer of 2-5, n is an integer of 4-6, R is as defined above and the amount of aluminum or zinc expressed as the oxide is 0.17-2% by weight based on the pigment.

The polymeric amine metallates are prepared by reacting the metal salts of this invention with the amines of this invention. The polymer is formed when the metallate is formed. The amine metallate will polymerize very readily at the conditions that the amines and the metal salts react. The polymerization is slow at room temperature and much faster, e.g., at 80° C.

The amine metallates can be prepared by reacting aluminum isopropoxide or a zinc compound with an alkanolamine corresponding to the desired ester. U.S. Pat. No. 2,985,685 discloses such preparation where the metal is aluminum.

Aluminum isopropoxide (AIPO), $Al[OCH(CH_3)_2]_3$, is a white solid with a melting point of 118° C. It is soluble in alcohols and hydrocarbons. It can be hydrolyzed to alumina hydrates or converted to alumina on further heating. It is produced commercially from the reaction of isopropyl alcohol and Al under reflux conditions. It has been used to coat $TiO_2$ with alumina.

The zinc compounds of this invention include zinc acetate, zinc isopropoxide and zinc alcoholate wherein the alcohol radical has 1-3 carbon atoms. Representative examples of such zinc compounds include zinc isopropoxide, zinc acetate, zinc ethanolate, zinc propionate, etc. The preferred zinc compound is zinc acetate.

The alkanolamines of this invention are of the general formulae

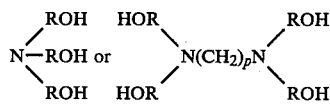

where R is 2-6 carbon atoms and p is an integer of 2-5.

Representative examples of the alkanolamines used to prepare the coatings of the present invention include triethanolamine (referred to herein as TEA), tripropanolamine, triisopropanolamine and N,N,N',N'-tetrakis(2-hydroxypropylethylenediamine) (referred to herein as Quadrol).

Polymeric triethanolamine aluminate (TEAAL) one of the preferred precursors of this invention can be prepared by reacting a mixture of TEA and AIPO in dry toluene, refluxing for one hour under $N_2$, stripping off the isopropyl alcohol generated, cooling the toluene/TEAAL and filtering. The product is a white powder. The following equations illustrate the reaction:

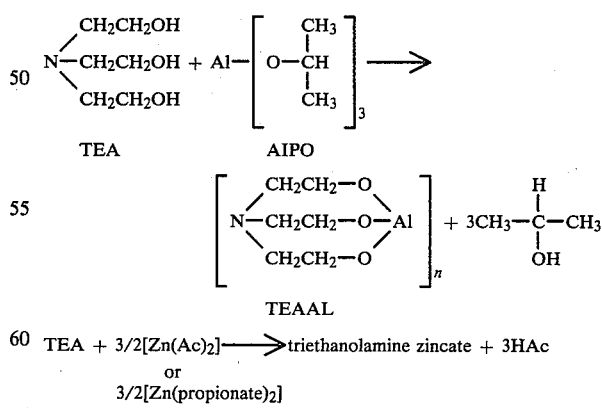

$$TEA + 3/2[Zn(Ac)_2] \longrightarrow \text{triethanolamine zincate} + 3HAc$$
or
$$3/2[Zn(\text{propionate})_2]$$

Still another of the preferred precursors of the polymeric amines of the invention are TEA and AIPO. When the stoichiometric amount of AIPO is reacted with the TEA, and total $Al_2O_3$ in the coating is 30%. Thus, in order to have a 30% $Al_2O_3$ in the coating, the stoichiometric amount of AlPO is reacted. However, more than the stoichiometric amount of AlPO is preferred.

Polymeric Quadrol aluminate is prepared by dissolving Quadrol/AlPO in toluene, refluxing for one hour under N₂, stripping off the isopropyl alcohol, and cooling and filtering. It is a glassylike crystalline compound.

Polymeric Quadrol aluminate is formed by the reaction between Quadrol and AlPO.

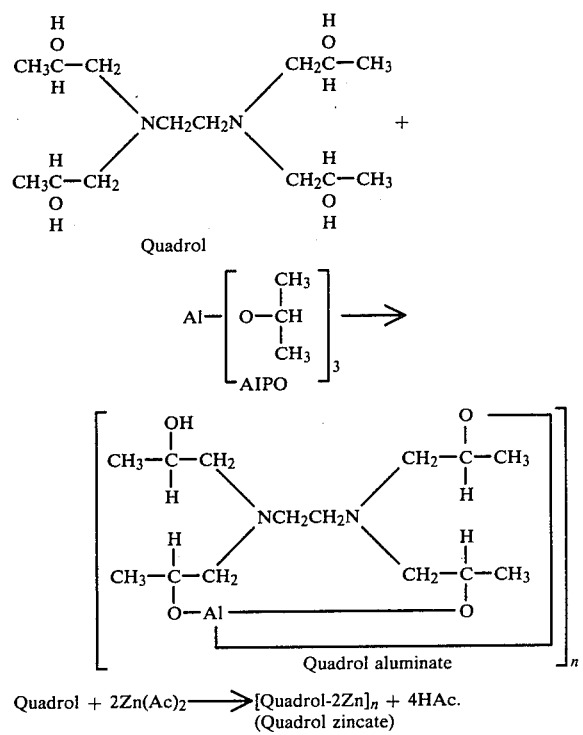

Quadrol + 2Zn(Ac)₂ ⟶ [Quadrol-2Zn]ₙ + 4HAc.
(Quadrol zincate)

The product of Quadrol and AlPO, namely, Quadrol aluminate, like the TEAAL is readily polymerized. Polymer Quadrol aluminate forms at the conditions under which the Quadrol and the AlPO react.

The polymeric amine metallate coating can be achieved by coating a substrate directly with said polymeric coating under conditions described herein or it may be achieved in situ by coating the substrate with the precursors of the polymeric amine metallate.

What is meant by the precursors of the polymeric amine metallates is, e.g., AlPO and TEA or AlPO and Quadrol.

The conditions for attaching the polymer or the product of the precursors of this invention to the substrate are conveniently present in a fluid energy mill. However, any apparatus may be used for coating a substrate as long as the conditions are similar to those present in the fluid energy mill. Particular fluid energy mills that can be used to carry out the present invention are described in U.S. Pat. Nos. 2,032,827; 3,462,086; 3,726,484 and 3,840,188 which are hereby incorporated by reference. Such mills are normally used to simultaneously dry and grind pulverulent solids. Superheated steam at temperatures of from 150°–350° C. can be used to attach the polymer to the substrate in the fluid energy mill. However, the substrate may be coated with the polymer of this invention at temperatures of from 50°–350° C. A temperature of 200°–250° C. is preferred when a fluid energy mill is used.

The invention is especially useful in the coating of inorganic oxides, quanacridone pigments, metal phthalocyanines, clay and sulfur. The preferred substrates are the inorganic oxides. Most preferred is TiO₂. For example, in the preparation of TiO₂ with the polymeric coating of this invention a surprisingly higher gloss results than where the coating is alumina. Even higher results of gloss are obtained when sufficient AlPO is used to give a total of at least 0.5% by weight of Al₂O₃ in the coating based on the pigment.

The solid substrates of the invention may be in particulate form or fibrous form. Particulate substrates are frangible particles and aggregates of particles that are not frangible. The TiO₂ substrates of the invention are preferably rutile TiO₂. What is meant by rutile TiO₂ is solid particulate TiO₂ that has a rutile structure according to X-ray diffraction and which may or may not have a coating which enhances its performance in end-use applications, e.g., silica coating for durability, alumina coating for enhanced dispersibility or both.

Fibrous substrates include fibrous TiO₂, fibers and fabrics of cotton, polyesters, polyacrylonitriles, polyamides, wool, rayons, etc.

In a fluid energy mill particles of the particulate substrate are conveyed in a plurality of streams from jets by a gaseous fluid such as superheated steam into the outer portion of an inwardly spiraling vortex at high velocity and in a manner which will maintain the vortex at a high rotative speed and a relatively small inward speed to cause the pigment particles to rub or strike against each other or against breaker plates within the mill. The superheated steam causes the polymer to become tacky and thus become attached to the particulate substrate. The particulate particles become desirably surface coated with the polymer and alumina that was formed in situ by the steam.

The preferred conditions of this invention involve the use of excess AlPO. The steam hydrolyzes this excess AlPO to form an extremely fine particulate alumina. This alumina is embedded in the tacky polymer when exposed to superheated steam of from 150°–350° C.

The polymeric amine metallates may be attached to the substrate by dissolving the polymeric amine metallate in a solvent and coating the substrate with this dissolved metallate. In this method, it is not necessary to use superheated steam. Merely evaporating the solvent is sufficient to attach the polymer to the substrate. Thus, generally a temperature of from 50°–350° C. can be used in the process of this invention. In this method of operation, small amounts of water are required to hydrolyze any excess AlPO to alumina.

EXAMPLES

The examples that follow further illustrate the invention.

EXAMPLE 1—BEST MODE

3632 Grams of TiO₂ pigment were blended with 71 g of aluminum isopropoxide dissolved in 200 cc of isopropyl alcohol at a temperature of 50° C. for 1 hour in a Patterson-Kelley Model LB-7280 Liquid-Solids Blender. This was followed by 30 minutes of blending with a solution of 15 g of triethanolamine dissolved in 100 cc of isopropyl alcohol.

The blended pigment/TEA/AlPO system was dried for 12 hours at 110° C. to remove the alcohol.

As a control, 3.63 Kg of $TiO_2$ pigment was blended with 15 g of triethanolamine dissolved in 100 cc of isopropyl alcohol for 30 minutes and dried for 12 hours at 110° C.

Both the $TiO_2$/TEA/AIPO and the control were steam treated in an 8″ fluid energy mill operated at 550° F. at a steam/pigment ratio of 3/1 and the products evaluated in an alkyd paint system.

|  | Surface Area $m^2/g$ | 30J Gloss | Relative Hiding |
|---|---|---|---|
| Std with 3% alumina | 10 | 69 | 100 |
| Ex 1 (0.5% $Al_2O_3$ based on AIPO | 6.2 | 80 | 109 |
| Control | 5.5 | 68 | 95 |

EXAMPLE 2

3632 Grams of $TiO_2$ pigment were blended with 15 g of TEA dissolved in 50 cc of isopropyl alcohol in a Patterson-Kelley Model LB-7280 Liquid-Solids Blender for 30 minutes. 71 Grams of AIPO dissolved in 150 cc of isopropyl alcohol are added to the blender. After an additional 30 minutes of blending, the pigment-/TEA/AIPO was placed in a tray, dried free of alcohol, sieved and fluid energy milled in an 8″ fluid energy mill at a ratio of steam to pigment of 3:1.

The total alumina as $Al_2O_3$ in the coating based on the pigment was 0.5% by weight. The coating was polymerized TEAAL with an average molecular weight of 840 and consisted of 17.3 g of TEAAL and 12.5 g of $Al_2O_3$.

The data obtained is summarized in the table below.

EXAMPLE 3

The procedure of Example 2 was followed except that 142 g of AIPO in 300 cc of isopropyl alcohol were used and the alumina as $Al_2O_3$ was 1% by weight based on the pigment. The polymerized coating was 17.3 g of TEAAL and 29.9 g of $Al_2O_3$.

The data obtained is summarized in the table below.

EXAMPLE 4

The procedure of Example 2 was followed except that 284 g of AIPO and 600 cc of isopropyl alcohol were used and the alumina as $Al_2O_3$ was 2% by weight based on the pigment. The polymerized coating was 17.3 g TEAAL and 64.6 g of $Al_2O_3$.

The data obtained is summarized in the table below.

EXAMPLE 5

The procedure of Example 2 was followed except that 30 g of zinc acetate was substituted for the AIPO in the form of a 25% by weight aqueous solution and the TEA was dissolved in 50 cc of water. The Zn as ZnO was 0.3% by weight based on the pigment. The polymerized coating was 21 g triethanolamine zincate.

The data obtained is summarized in the table below.

EXAMPLE 6

The procedure of Example 2 was followed except that 21.9 g of Quadrol was substituted for the TEA and 142 g of AIPO were used. The alumina in the coating as $Al_2O_3$ was 1% by weight based on the pigment. The coating was 23.8 g of Quadrol aluminate and 31 g of $Al_2O_3$.

The data obtained is summarized in the table below.

EXAMPLE 7

The procedure of Example 2 was followed except that 21.9 g of Quadrol was substituted for the TEA, 50 cc of water were used to dissolve the Quadrol and 33 g of zinc acetate were used in place of AIPO and made into a 25% solution in water. The polymeric coating was 31.4 g of Quadrol zincate.

The data obtained is summarized in the table below.

| Example | Surface Area* $m^2/g$ | 30J Gloss | Relative Hiding |
|---|---|---|---|
| 2 | 6.2 | 80 | 109 |
| 3 | 8.6 | 80 | 106 |
| 4 | 12.7 | 78 | 109 |
| 5 | 4.9 | 78 | — |
| 6 | 6.4 | 80 | 106 |
| 7 | — | 73 | 100 |

*Surface area by the standard B.E.T. method.

EXAMPLES 8–11

The procedures of Examples 2 or 5 were followed depending on whether AIPO or zinc acetate was used with the amounts indicated below:

| Examples | $TiO_2$ grams | Quadrol grams | TEA grams | AIPO grams | $Zn(Ac)_2$ grams | Metal Oxide in Polymeric Coating |
|---|---|---|---|---|---|---|
| 8 | 3632 | 35 | — | 24.6 | — | 1% |
| 9 | 3632 | — | 30 | 61 | — | 1% |
| 10 | 3632 | — | 22.5 | — | 50 | 1% |
| 11 | 3632 | 29.2 | — | — | 33.3 | 1% |

The coated $TiO_2$ was dispersed in the plastic indicated below and the data obtained is shown below:

| | Flexible Vinyl Chloride Polymer | | |
|---|---|---|---|
| Examples | Tinting Strength | Brightness | Yellowness Index |
| 8 | 101.8 | 89.3 | 6.9 |
| 9 | 102.4 | 89.7 | 6.1 |
| 10 | 100 | 89.7 | 5.7 |
| 11 | 101.2 | 88.9 | 6.0 |
| Control | 99 | 88.0 | 5.3 |

| | Polyethylene | |
|---|---|---|
| Examples | Brightness | Yellowness Index |
| 8 | 90.2 | 4.7 |
| 9 | 90.4 | 2.8 |
| 10 | 90.2 | 2.7 |
| 11 | 89.4 | 3.4 |
| Control | 89.4 | 3.3 |

Brightness is the Green Filter Reflectance. Yellowness Index is the Red Filter Reflectance-Blue Filter Reflectance divided by Green Filter Reflectance times 100 as determined by using a Hunter reflectometer.

30J Gloss was determined in the following manner: A starting composition or mill base was prepared by manually mixing 387.0 g of the $TiO_2$ pigment to be tested with 149.6 g of an alkyd resin (a commercial resin sold by Celanese Coatings Co. under the name "Syntex" 3145, 60% N.V.), 9.4 g of butanol and 79.0 g of a commercially available aromatic solvent (sold by Esso Standard Oil under the name "Xylol"). The mixture was then placed in a container, inserted in a machine equipped with a sand grinding disc and 700 g of sand were added at a rotation speed of 500 rpm. After adding all the sand, grinding was continued for 5 minutes at 2750 rpm. The mill base was isolated from the sand by filtration through coarse and fine strainers.

The mill base was reduced by mixing 100 g of the mill base with 1.4 g of a commercially available aromatic solvent ("Xylol"), 71.8 g of alkyd resin ("Syntex" 3145), 38.5 g of a 55% solids crosslinking melamine resin (a commercial resin sold by American Cyanamid under the name "Cymel" 248-8), 12.0 g of naphtha and 1.0 g of butanol. The resultant mixture constituted the finished paint formulation. In order to prepare the paint for spraying, additional "Xylol" was added to a given weight of the paint so that 50 ml flowed through a 10 F viscosity cup in 16 seconds.

The reduced paint was sprayed onto an aluminum panel to visual hiding, i.e., a film thickness of about 1.2 mils. The panel was flashed or allowed to stand for 10 minutes at room temperature to allow the volatile components to evaporate and was then baked for 45 minutes at 149° C.

The panels were allowed to cool, then placed on a gloss meter set at an angle of 20° and the gloss was read directly from the gloss meter.

The polymeric amine metallate coatings of this invention give the substrate unusual and unexpected properties. For example, fabric coated with polymerized TEAAL and fabric coated with polymerized Quadrol aluminate were very effective in dissipating a static charge, fabric coated with sulfur as a fire retardant that was coated with the polymeric amine metallate was effective in eliminating sulfur odor, $TiO_2$ pigments coated with said polymeric metallates displayed improved gloss in paint systems and improved dispersibility in plastics and the polymeric zincate coatings give the $TiO_2$ extremely effective mildew resistant properties.

INDUSTRIAL APPLICABILITY

The polymeric amine metallates are useful in industry to enhance properties of the coated substrate. For example, coated $TiO_2$ has improved gloss in paint systems and better dispersibility in plastics.

I claim:

1. A solid particulate rutile $TiO_2$ pigment substrate having a coating consisting essentially of (a) a polymeric amine metallate of the general formula

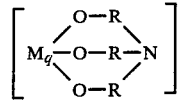

where R is an alkylene radical of from 2–6 carbon atoms, n is an integer of 4–6, q is 1 when M is aluminum and q is 3/2 when M is zinc and M is aluminum or zinc or (b) a polymeric amine metallate of the general formula

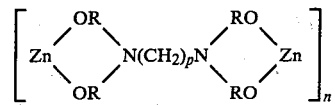

or (c)

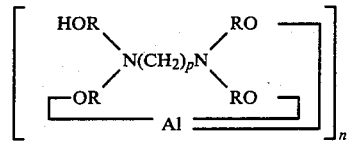

where p is an integer from 2–5, n is an integer of 4–6, R is as defined above and the amount of aluminum or zinc expressed as an oxide is 0.17–2% by weight based on the weight of substrate.

2. The coated substrate of claim 1 wherein the substrate has a surface area of at least 1 $m^2/g$.

3. The coated substrate of claim 2 wherein the surface area of the coated substrate is no more than 10% greater than the surface area of the particulate rutile $TiO_2$.

4. The coated substrate of claim 1 wherein M is aluminum.

5. The coated substrate of claim 1 wherein M is zinc.

6. A process for preparing a particulate pigment substrate coated with a polymeric amine metallate consisting essentially of coating the substrate with a polymeric amine metallate of the general formula in claim 1 or the precursors thereof and exposing the substrate and amine metallate or the precursors thereof to a temperature of from 50°–350° C. to prepare the substrate coated with the polymeric amine metallate.

7. The process of claim 6 wherein R is an alkylene radical of 2 carbon atoms and M is aluminum.

8. The process of claim 6 wherein R is an alkylene radical of 2 carbon atoms and M is zinc.

9. The process of claim 6 wherein the substrate is coated with polymeric amine metallate by mixing the precursors of the polymeric amine metallate with the substrate in a fluid energy mill to polymerize said precursors and attach the polymer formed to the substrate at a temperature of from 150°–350° C.

10. The process of claim 6 wherein the substrate is coated with the polymeric amine metallate by mixing said polymer with the substrate in a fluid energy mill in the presence of steam at a temperature of from 150°–350° C.

11. The process of claim 6 wherein the polymeric amine metallate is triethanolamine aluminate.

12. The process of claim 6 wherein the polymeric amine metallate is triethanolamine zincate.

13. The process of claim 9 wherein the polymeric amine metallate is triethanolamine aluminate.

14. The process of claim 9 wherein the polymeric amine metallate is triethanolamine zincate.

* * * * *